(12) United States Patent
Yamaguchi et al.

(10) Patent No.: US 7,399,171 B2
(45) Date of Patent: Jul. 15, 2008

(54) ROTARY PUMP FOR BRAKING DEVICE

(75) Inventors: Takahiro Yamaguchi, Kariya (JP); Takashi Satou, Kariya (JP); Shigeki Torii, Kariya (JP); Toshiya Hayashi, Yokkaichi (JP); Akihiro Yada, Yokkaichi (JP); Hitoshi Mizutani, Kuwana (JP); Takuya Fukitsuke, Inabe (JP); Kazunori Uchiyama, Okazaki (JP); Naoki Hakamada, Anjo (JP)

(73) Assignees: Advics Co., Ltd., Aichi-pref. (JP); DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 349 days.

(21) Appl. No.: 11/259,059

(22) Filed: Oct. 27, 2005

(65) Prior Publication Data
US 2006/0093507 A1 May 4, 2006

(30) Foreign Application Priority Data
Oct. 28, 2004 (JP) ............................. 2004-313959

(51) Int. Cl.
 *F04C 18/00* (2006.01)
(52) U.S. Cl. ........................... 418/171; 418/75; 418/76; 418/132
(58) Field of Classification Search ................ 418/171, 418/166, 75, 76, 132
See application file for complete search history.

(56) References Cited

U.S. PATENT DOCUMENTS

| | | | | |
|---|---|---|---|---|
| 3,212,449 A | * | 10/1965 | Whalen et al. | 418/75 |
| 3,796,522 A | * | 3/1974 | Oshima et al. | 418/171 |
| 6,273,527 B1 | * | 8/2001 | Yamaguchi et al. | 418/171 |
| 6,474,752 B2 | * | 11/2002 | Harada et al. | 418/171 |
| 6,715,847 B2 | * | 4/2004 | Yamaguchi et al. | 418/171 |
| 6,749,272 B2 | * | 6/2004 | Uchiyama et al. | 418/171 |
| 6,783,193 B2 | * | 8/2004 | Yamaguchi et al. | 418/171 |
| 6,905,321 B2 | | 6/2005 | Uchiyama et al. | |

* cited by examiner

*Primary Examiner*—Thomas Denion
*Assistant Examiner*—Mary A Davis
(74) *Attorney, Agent, or Firm*—Posz Law Group, PLC (57) ABSTRACT

The curvature of a circular arc constituted by a side of a suction groove is made larger than that of a circular arc constituted by a side of a discharge groove. Thus, when the suction groove and the discharge groove are viewed in the axial direction of a drive shaft, the distance between the suction groove and the discharge groove in the radial direction of a rotary portion is short in a region intersecting with a line W perpendicular to a centerline, and increases in accordance with a decrease in distance from containment portions. It is therefore possible to ensure a sufficient distance between the discharge and suction grooves and enhance a total fluid pressure generated therebetween, and the contact surface pressure that is necessitated by a second side plate to obtain a press-back force when being in contact with an outer rotor and an inner rotor is reduced.

4 Claims, 10 Drawing Sheets

PRIOR ART

ROTARY PUMP FOR BRAKING DEVICE

CROSS REFERENCE TO RELATED APPLICATION

This application is based upon and claims the benefit of Japanese Patent Application No. 2004-313959 filed on Oct. 28, 2004, the content of which are incorporated herein by reference.

FIELD OF THE INVENTION

The present invention relates to a rotary pump for a braking device for sucking and discharging brake fluid.

BACKGROUND OF THE INVENTION

The use of an internal gear type rotary pump such as a trochoid pump or the like as a pump for a braking device has been conventionally proposed (e.g., see Japanese Patent Laid-Open Publication No. 2004-11520).

Figure 5A:
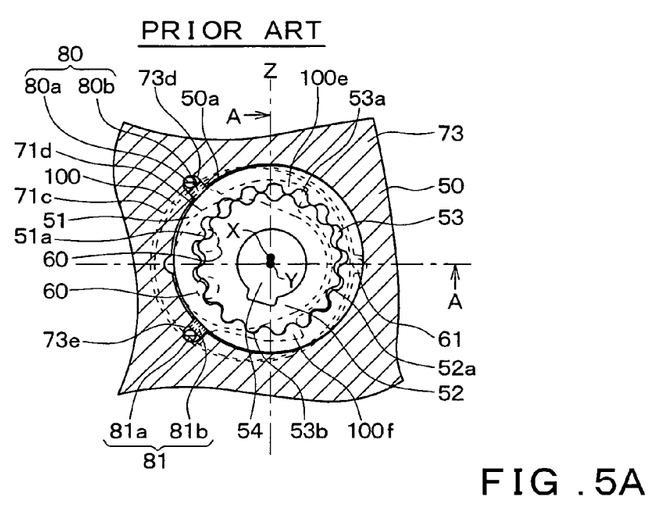
FIG. 5A is a cross-sectional view of the rotary pump that is cut along a plane perpendicular to its rotating axis.
Figure 5B:
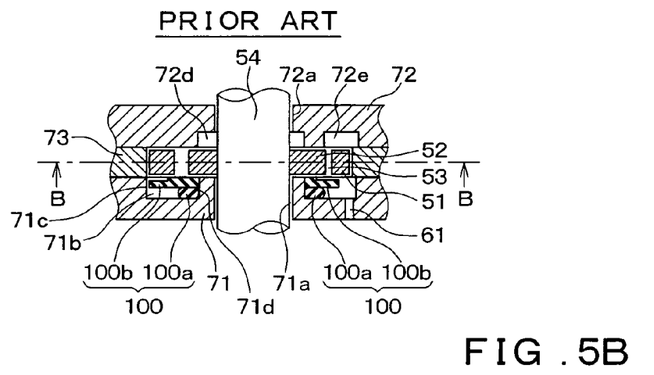
FIG. 5B is a cross-sectional view taken along a line A-A in FIG. 5A.
Figure 5C:
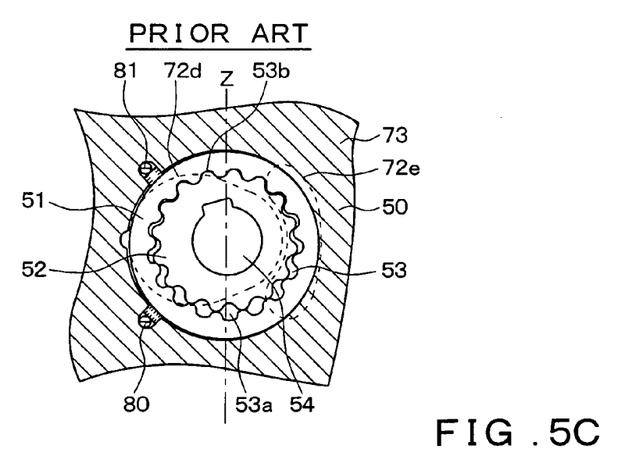
FIG. 5C is a cross-sectional view taken along a line B-B in FIG. 5B.

FIGS. 5A, 5B, and 5C are cross-sectional views of a conventional rotary pump for a braking device. FIG. 5A is a cross-sectional view of the rotary pump that is cut along a plane perpendicular to its rotating axis. FIG. 5B is a cross-sectional view taken along a line A-A in FIG. 5A. FIG. 5C is a cross-sectional view taken along a line B-B in FIG. 5B.

The rotary pump shown in FIGS. 5A, 5B, and 5C is composed of an outer rotor 51 having an inner toothed portion 51a along an inner periphery thereof, an inner rotor 52 having an outer toothed portion 52a along an outer periphery thereof, a casing 50 for accommodating the outer rotor 51 and the inner rotor 52, and the like. The outer rotor 51 and the inner rotor 52 are disposed in the casing 50 with the inner toothed portion 51a and the outer toothed portion 52a meshing with each other to form a plurality of interstitial portions 53.

The casing 50 is composed of a first side plate 71 disposed on an end face of the outer rotor 51, a second side plate 72 disposed on an end face of the inner rotor 52, and a central plate 73 in which a circular hole corresponding in shape to the outer rotor 51 is formed. The outer rotor 51 and the inner rotor 52 are accommodated in a rotary chamber formed by the casing 50.

Given that a line passing through both a central axis X of the outer rotor 51 and a central axis Y of the inner rotor 52 is a centerline Z of the pump, a suction port 60 and a discharge port 61 communicating with the interstitial portions 53 are provided on opposed sides with respect to the centerline Z. When the pump is driven, the inner rotor 52 makes a rotational movement via a drive shaft 54 whose center coincides with the central axis Y of the inner rotor 52. In accordance with the rotational movement of the inner rotor 52, the outer rotor 51 also rotates in the same direction due to the meshing of the inner toothed portion 51a with the outer toothed portion 52a. In this case, the respective interstitial portions 53 increase and decrease in volume while the outer rotor 51 and the inner rotor 52 rotate by 360°. Thus, brake fluid is sucked from the suction port 60 and discharged from the discharge port 61.

One axial end face of the rotary pump is sealed by a sealing member 100 equipped with an elastic member 100a such as rubber and a resin member 100b. More specifically, the sealing member 100 is accommodated in a sealing groove portion 71b formed in a side seal 71, and performs a sealing function when the elastic member 100a presses the resin member 100b.

The other axial end face of the rotary pump is mechanically sealed by bringing end faces of the inner rotor 52 and the outer rotor 51 into direct contact with the second side plate 72. The outer rotor 51 and the inner rotor 52 are pressed toward the second side plate 72 by the resin member disposed on said one face and a brake fluid pressure. This pressing force brings the outer rotor 51 and the inner rotor 52 into contact with the second side plate 72. In this manner, the above-mentioned mechanical sealing is realized.

In the case where one axial end face of the rotary pump is thus mechanically sealed, the friction resistances between the outer rotor 51 and the inner rotor 52 on the one hand and the second side plate 72 on the other increase on the side of that end face, thus causing an increase in driving torque. Also, the contact areas between the outer rotor 51 and the inner rotor 52 on the one hand and the second side plate 72 on the other increase. Therefore, especially at a low temperature corresponding to a high viscosity of brake fluid, the shear resistance of brake fluid increases and thus causes an increase in driving torque.

Thus, in the conventional rotary pump, a suction groove 72d communicating with the suction port 60 and a discharge groove 72e communicating with the discharge port 61 are provided in the second side plate 72 on the mechanically sealed side.

The suction groove 72d and the discharge groove 72e serve to introduce fluid pressures into the suction port 60 and the discharge port 61, press back the outer rotor 51 and the inner rotor 52, and decrease a force for pressing the outer rotor 51 and the inner rotor 52 to the second side plate 72, thus achieving a reduction in friction resistance. This makes it possible to prevent an increase in driving torque.

Figure 6:
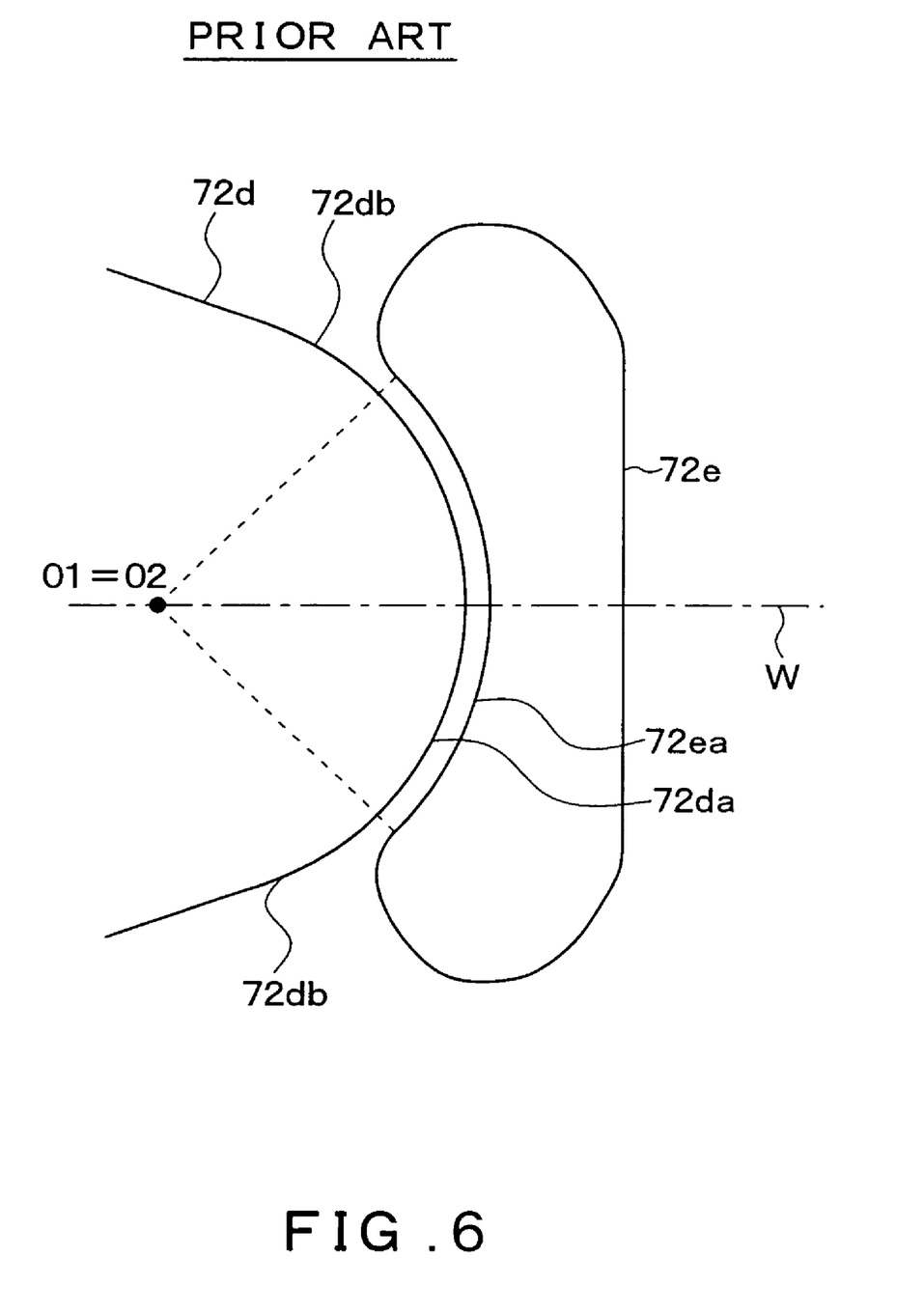
FIG. 6 is a partially enlarged view of a discharge groove 72e and a suction groove 72d in FIG. 5C.

In the aforementioned conventional rotary pump, as shown in FIG. 5C, the curvature of a circular arc constituted by a side 72ea of the discharge groove 72e on the side of the drive shaft 54 is set equal to that of a circular arc constituted by a side 72da of the suction groove 72d facing the side 72ea of the discharge groove 72e. That is, an illustration in FIG. 6 is obtained by partially enlarging the discharge groove 72e and the suction groove 72d in FIG. 5C. Thus, centers O1 and O2 of the circular arcs constituted by the sides 72da and 72ea respectively are identical to each other. Accordingly, when the suction groove 72d and the sealing groove portion 71b are viewed in the axial direction of the drive shaft 54, the distance between those sides is basically constant.

The suction groove 72d is axisymmetrical with respect to the line W perpendicular to the centerline Z passing through the central axis Y. From the side facing the discharge groove 72e to a region communicating with the suction port 60, the suction groove 72d is formed as an inclined straight line portion 72db and has a gradually increased groove width in a direction parallel to the centerline Z.

By conducting an endurance test as to the rotary pump having the suction groove 72d and the discharge groove 72e formed as described above, the inventors have confirmed contact traces on the second side plate 72 in a region from the straight line portion 72db of the suction groove 72d to the discharge groove 72e. These contact traces are considered to be ascribable to a partial increase in contact surface pressure and thus in contact resistance between the second side plate 72 on the one hand and the outer rotor 51 and the inner rotor 52 on the other. This increase in contact resistance is considered to be the cause of an increase in driving torque of the rotary pump.

SUMMARY OF THE INVENTION

It is an object of the present invention to achieve a further reduction in driving torque of a rotary pump.

Figure 7:
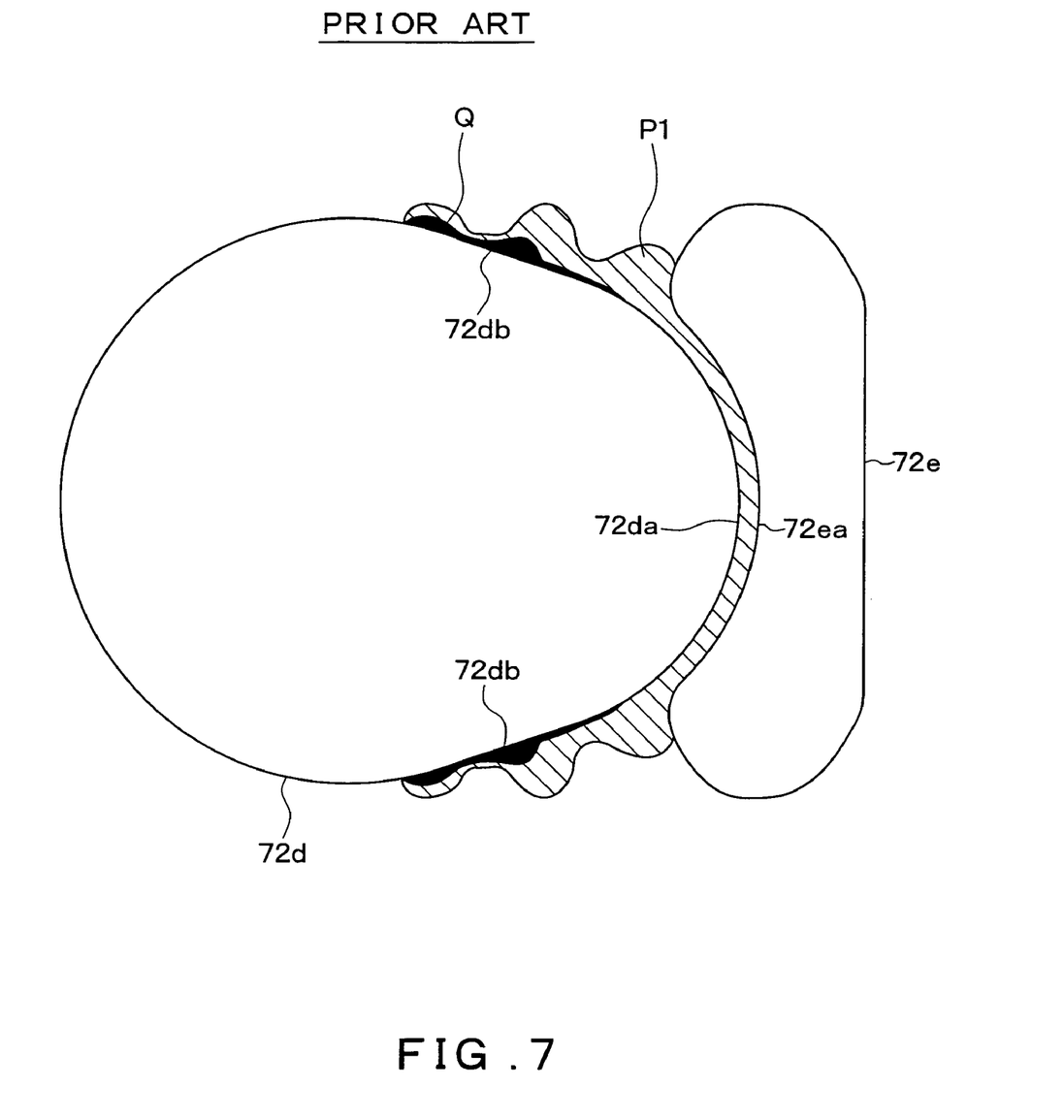
FIG. 7 is a schematic view showing a result obtained by checking a surface pressure applied to a second side plate of the conventional rotary pump.

By checking a surface pressure applied to the second side plate 72 in the neighborhood of the containment portions 53a and 53b for the purpose of achieving the above object, the inventors have obtained a result shown in FIG. 7.

Referring to FIG. 7, the second side plate 72 that is in contact with the inner rotor 52 exhibits a high contact surface pressure in a hatched region P1, and an especially high contact surface pressure in blackened regions Q. Corrugated portions of the contour of the hatched region P1 are located at positions corresponding to an outer tooth line of the inner rotor 52, and the regions Q are located adjacent to the straight line portions 72db of the suction groove 72d and extend in a corrugated manner along them respectively.

As a matter of course, high pressures are applied to the outer rotor 51, the inner rotor 52, and the containment portion 53a, namely, one of the interstitial portions 53 that is formed by the first side plate 71 and the second side plate 72 and does not communicate with the suction port 60 or the discharge port 61. However, the above-mentioned contact surface pressure has turned out to change even around the containment portion 53a, that is, to increase in accordance with a decrease in distance from the suction port 60 and decrease in accordance with a decrease in distance from the discharge port 61.

It is apparent herein that a force applied from the second side plate 72 to press back the outer rotor 51 and the inner rotor 52 (hereinafter referred to simply as a press-back force) is the sum of a fluid pressure between the second side plate 72 on the one hand and the outer rotor 51 and the inner rotor 52 on the other and a contact surface pressure that is applied to the second side plate 72 when being in contact with the outer rotor 51 and the inner rotor 52. Thus, the lower the fluid pressure becomes, the higher the contact surface pressure becomes. Contact traces are therefore considered to be left on the second side plate 72 in a region of a high contact surface pressure.

In consideration of the difference in the above-mentioned fluid pressure depending on position, it is possible to mention that the fluid pressure in the containment portion 53a increases as the outer rotor 51 and the inner rotor 52 rotate in their rotational directions and that the pressure in the suction groove 72d is low while the pressure in the discharge groove 72e is high.

Figure 8A:
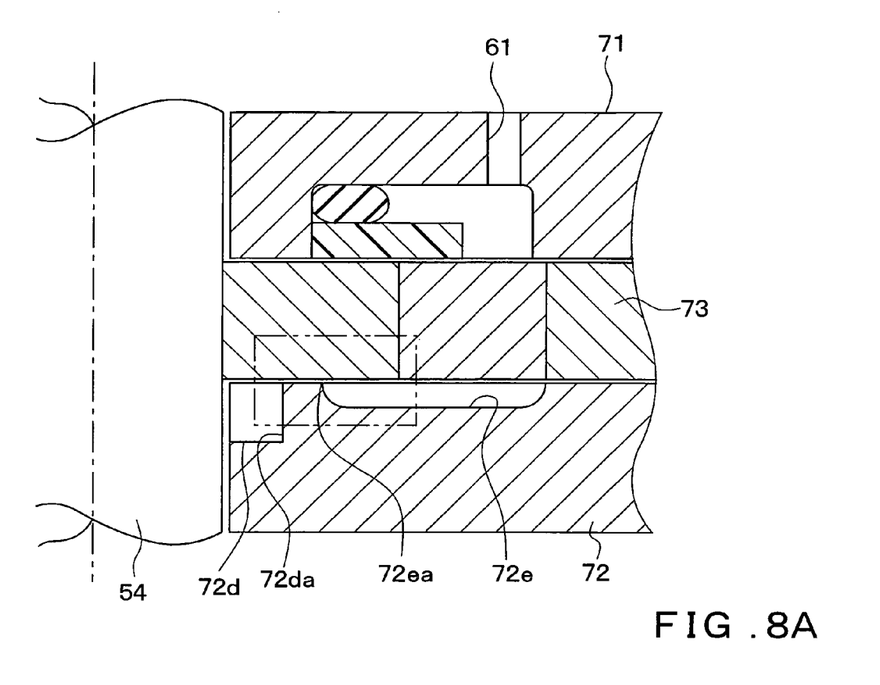
FIG. 8A is an enlarged cross-sectional view of the neighborhood of the suction groove 72d and the discharge groove 72e of the conventional rotary pump.
Figure 8B:
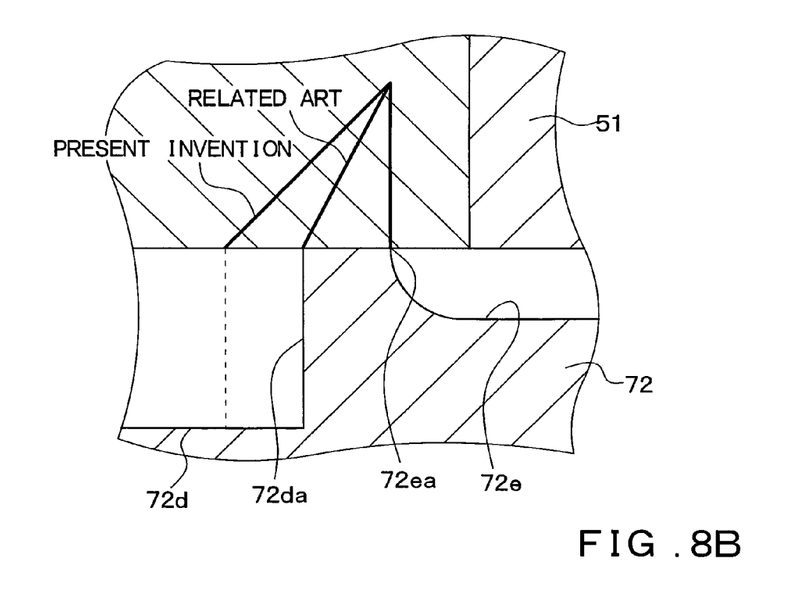
FIG. 8B is a view showing the distribution of fluid pressure between the suction groove 72d and the discharge groove 72e.

Bearing the foregoing facts in mind, as shown in an enlarged cross-sectional view of the neighborhood of the suction groove 72d and the discharge groove 72e in FIG. 8A, the conventional rotary pump is structured such that the fluid pressure decreases from a high pressure in the discharge groove 72e to a low pressure in the suction groove 72d despite a short distance from the suction groove 72d to the discharge groove 72e. The fluid pressure between the suction groove 72d and the discharge groove 72e, which is distributed as indicated by a wide line in FIG. 8B, abruptly changes in a range from an end portion of the discharge groove 72e to an end portion of the suction groove 72d. It is concluded that a high contact surface pressure is required in a region of an insufficient-fluid pressure, namely, in the neighborhood of the suction groove 72d, and that contact traces are left on the second side plate 72 in such a region.

The inventors have therefore considered that the contact surface pressure necessitated by the second side plate 72 to obtain a press-back force when being in contact with the outer rotor 51 and the inner rotor 52 decreases to the extent of enabling a reduction in the driving torque of the rotary pump if the total fluid pressure between the discharge groove 72e and the suction groove 72d can be enhanced by increasing the distance therebetween and ensuring the introduction of a corresponding amount of high-pressure fluid therebetween. In other words, in comparison with the conventional fluid pressure distribution shown in FIG. 8B, the gradient of fluid pressure distribution is made gentler by increasing the contact areas between the second side plate 72 on the one hand and the outer rotor 51 and the inner rotor 52 on the other.

In view of the foregoing speculation, the inventors have devised the following structure.

Figure 9:
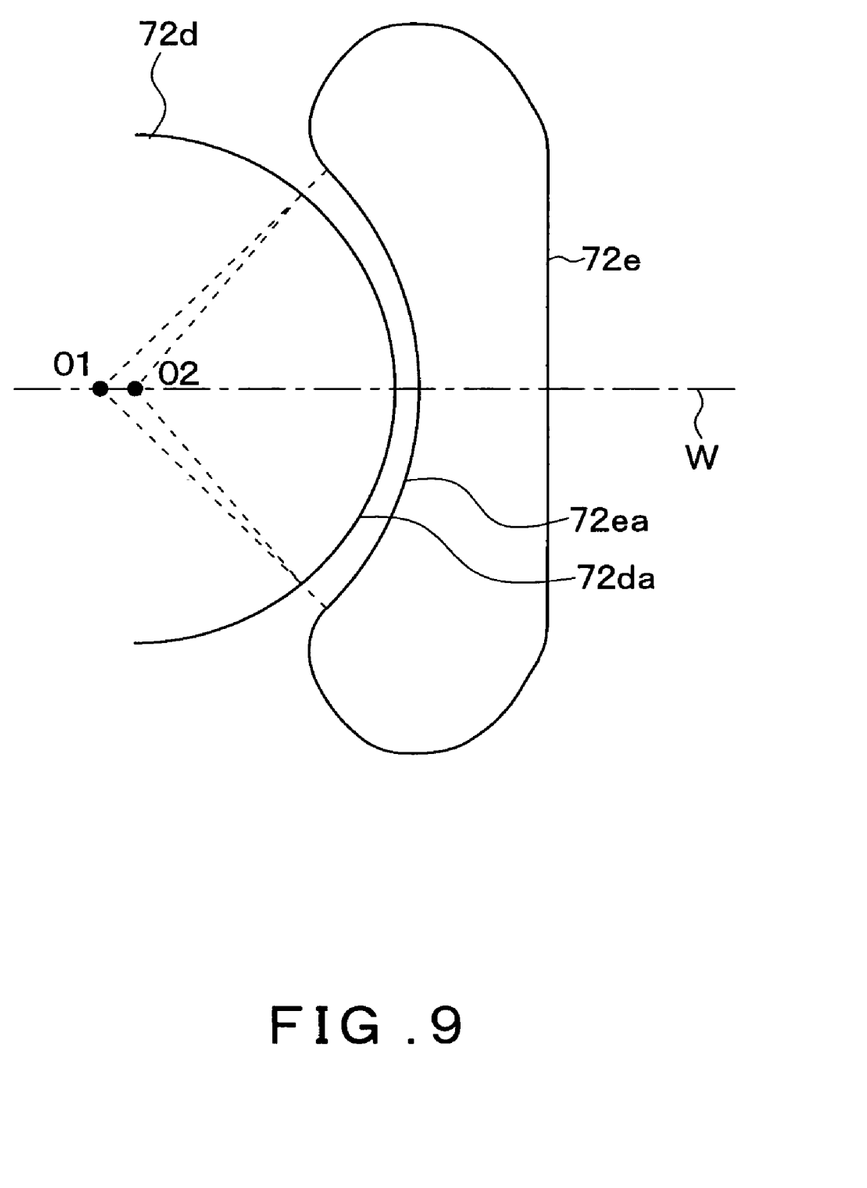
FIG. 9 is a schematic view showing only a suction groove 72*d* and a discharge groove 72*e* of a rotary pump studied by the inventors.

FIG. 9 shows an example of the structure. This figure schematically shows only the suction groove 72d and the discharge groove 72e in the rotary pump. As shown in this figure, the curvature of the circular arc constituted by the side 72da of the suction groove 72d is set larger than that of the circular arc constituted by the side 72ea of the discharge groove 72e. In this case, the center O1 of the circular arc constituted by the side 72ea of the discharge groove 72e is located closer to the suction port 60 than the center O2 of the circular arc constituted by the side 72da of the suction groove 72d. When the suction groove 72d and the sealing groove portion 71b are viewed in the axial direction of the drive shaft 54, the distance between the side 72da and the side 72ea in the radial direction of the rotary portion is short in a region intersecting with the line W perpendicular to the centerline Z and increases in accordance with a decrease in distance from the containment portions 53a and 53b.

An endurance test conducted as to the rotary pump having such a shape reveals that the number of contact traces on the second side plate 72 has become very small.

Figure 10:
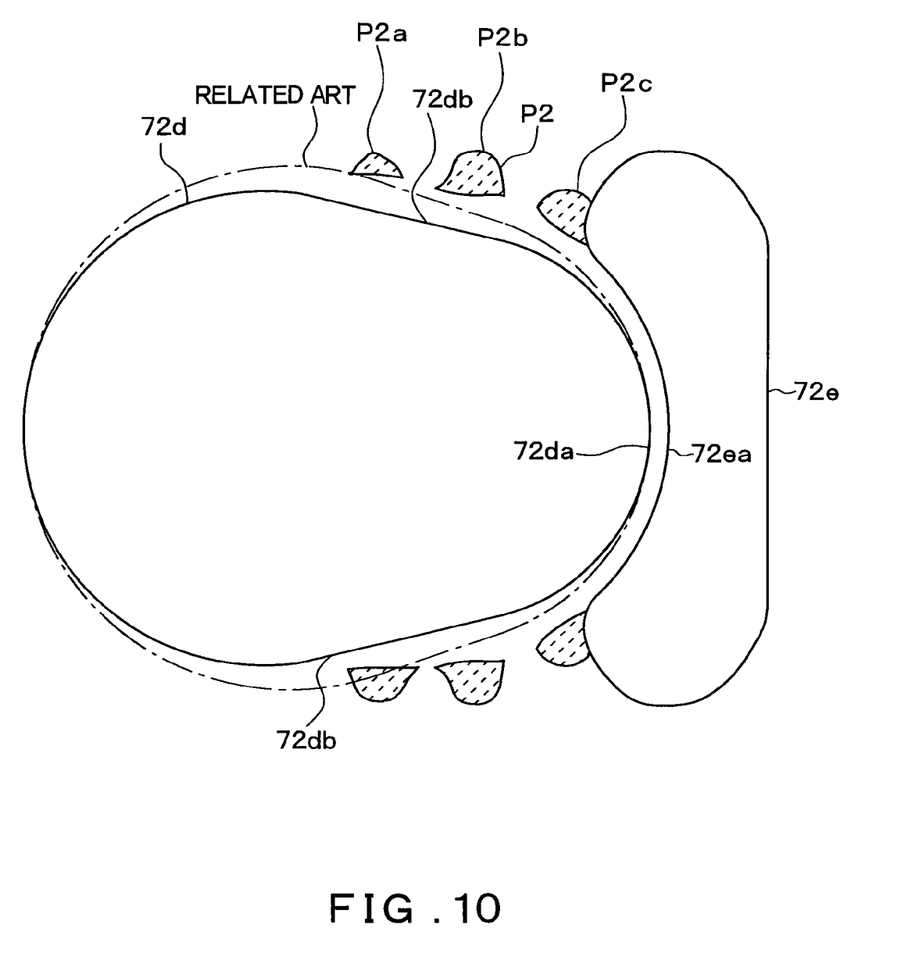
FIG. 10 is a schematic view showing a result obtained by checking a surface pressure applied to a second side plate of the rotary pump shown in FIG. 9.

A result shown in FIG. 10 has been obtained by checking the surface pressure applied to the second side plate 72 in the neighborhood of the containment portions 53a and 53b.

Referring to FIG. 10, the second side plate 72 that is in contact with the inner rotor 52 exhibits a high contact surface pressure in hatched regions P2. Contours P2a, P2b, and P2c of the three upper hatched regions P2, which are spaced apart from the suction groove 72d, are located at the same positions as the corrugated portions of contours of the hatched region P1 illustrated in FIG. 7. However, the second side plate 72 exhibits a sufficiently lower contact surface pressure at a position facing a region spaced apart from the tooth tip of the inner rotor 52, in comparison with the case of the conventional rotary pump shown in FIG. 7. This demonstrates that the driving torque of the rotary pump has been reduced.

The inventors then made a study also on the relationship in shape between the suction groove 72d formed in the second side plate 72 and the sealing groove portion 71b formed in the first side plate 71.

In the conventional rotary pump, since the fluid pressure inside the inner edge of the sealing groove portion 71b formed in the first side plate 71 is low, the suction groove 72d in the second side plate 72 is formed in the same shape as the inner edge of the sealing groove portion 71b. Therefore, the curvature of the circular arc constituted by the side 72ea of the discharge groove 72e and the curvature of the circular arc constituted by the side 72da of the suction groove 72d are set equal to each other, and the centers O1 and O2 of circles constituting those respective sides coincide with each other. When the suction groove 72d and the sealing groove portion 71b are viewed in the axial direction of the drive shaft 54, the distance from the side 72da to the side 72ea in the radial direction of the rotary portion is constant.

Figure 11:
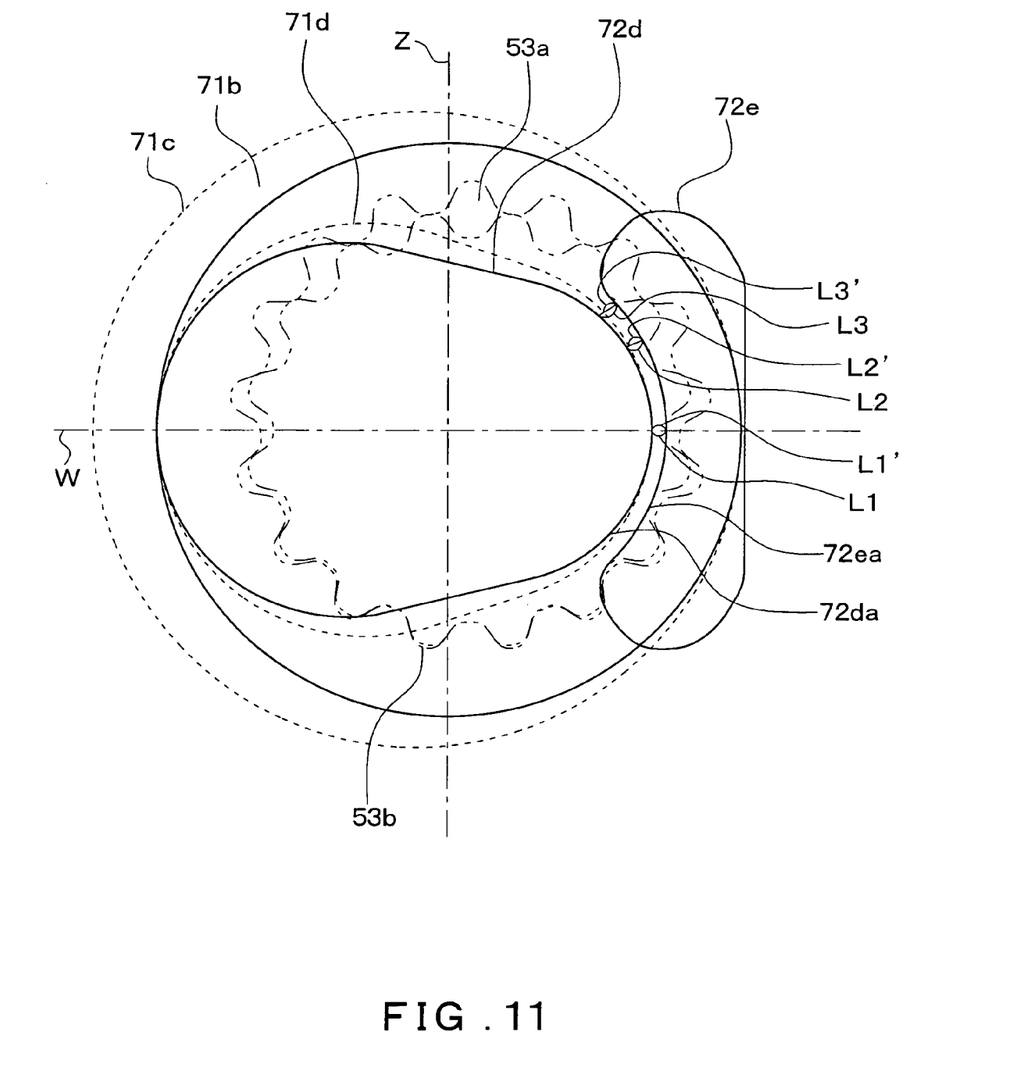
FIG. 11 is a schematic view showing only a suction groove 72*d* and a discharge groove 72*e* of another rotary pump studied by the inventors.

Thus, the inventors have devised a structure wherein the side 72da of the suction groove 72d formed in the second side plate 72 is disposed inside the inner edge of the sealing groove portion 71b formed in the first side plate 71. In this case, in accordance with a shift from a region intersecting with the line W perpendicular to the centerline Z to the containment portion 53a, while the distance from the inner edge of the sealing groove portion 71b formed in the first side plate 71 to the discharge groove 72e sequentially assumes L1'(, L2', and L3' (L1'=L2'=L3'), the distance from the suction groove 72d to the discharge groove 72e in the second side plate 72 sequentially assumes L1, L2, and L3 (L1<L2<L3).

An endurance test conducted on a rotary pump having such a shape reveals that the number of contact traces in the second side plate 72 has become very small. In this case as well, therefore, the surface pressure applied to the second side plate 72 is considered to conform to a result shown in FIG. 10 in the neighborhood of the containment portions 53a and 53b. In this case as well, accordingly, a sufficient reduction in contact surface pressure is achieved in comparison with the case of the conventional rotary pump shown in FIG. 7, so that the driving torque of the rotary pump can be reduced.

Thus, according to a first aspect of the present invention, in the case where gaps between axial end faces of an outer rotor and an inner rotor and an axial end face of a second side plate are mechanically sealed, a discharge groove communicating with a discharge port and a suction groove communicating with a suction port are formed in the mechanically sealed axial end face of the second side plate, that the discharge groove and the suction groove include a circular-arc side facing the suction groove and a circular-arc side facing the discharge groove respectively, and that the curvature of the circular-arc side of the suction groove is larger than that of the circular-arc side of the discharge groove.

This construction can increase the distance between the discharge groove and the suction groove and contribute to an increase in area, thus making it possible to enhance the total fluid pressure between the discharge groove and the suction groove. The contact surface pressure that is necessitated by the second side plate to obtain a press-back force when being in contact with the outer rotor and the inner rotor is reduced, so that the driving torque of the rotary pump can be reduced. That is, as described above, the fluid pressure can be more widely distributed than the conventional fluid pressure distribution by increasing the contact areas between the second side plate on the one hand and the outer rotor and the inner rotor on the other, and the contact surface pressure resulting from the press-back force can be reduced by increasing the fluid pressure.

It is therefore possible to prevent or suppress an increase in driving torque in the case where mechanical sealing is adopted.

According to a second aspect of the present invention, in the case where gaps between axial end faces of an outer rotor and an inner rotor and an axial end face of a second side plate are mechanically sealed, a discharge groove communicating with a discharge port and a suction groove communicating with a suction port are formed in the mechanically sealed axial end face of the second side plate, that the discharge groove and the suction groove include a circular-arc side facing the suction groove and a circular-arc side facing the discharge groove respectively, and that a center of the circular arc constituted by the side of the discharge groove is located closer to the suction port than a center of the circular arc constituted by the side of the suction groove.

This construction can ensure a sufficient distance between the discharge groove and the suction groove and enhance the total fluid pressure generated therebetween, thus making it possible to achieve the same effect as that of the aforementioned first aspect of the present invention.

According to a third aspect of the present invention, in the case where a sealing groove portion passing through a space between the discharge groove and the drive shaft and extending to an outer periphery of the outer rotor through a first containment portion and a second containment portion is formed in the first side plate and sealing means is disposed in the sealing groove, the distance between the sealing groove and the suction groove in the radial direction of a rotary portion gradually increases in accordance with a decrease in distance from the first containment portion and the second containment portion when the suction groove and the sealing groove portion are viewed in the axial direction of the drive shaft.

This construction can also reduce the surface pressure applied to the second side plate in the neighborhood of the first containment portion and the second containment portion in comparison with conventional cases, thus making it possible to achieve the same effect as that of the aforementioned first aspect of the present invention.

In the aforementioned first to third aspects of the present invention, it is preferable that the suction groove configures an oval shape having circular arc portions and parallel straight line portions.

By thus forming the suction groove into a simple shape such as an oval shape, it becomes easy to machine the suction groove. The term "oval" is intended to mean that the suction groove is substantially oval. For instance, the circular arc forming part of the oval shape may have a linear tip portion at that position of the suction groove which is most distant from the discharge groove.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

Figure 1:
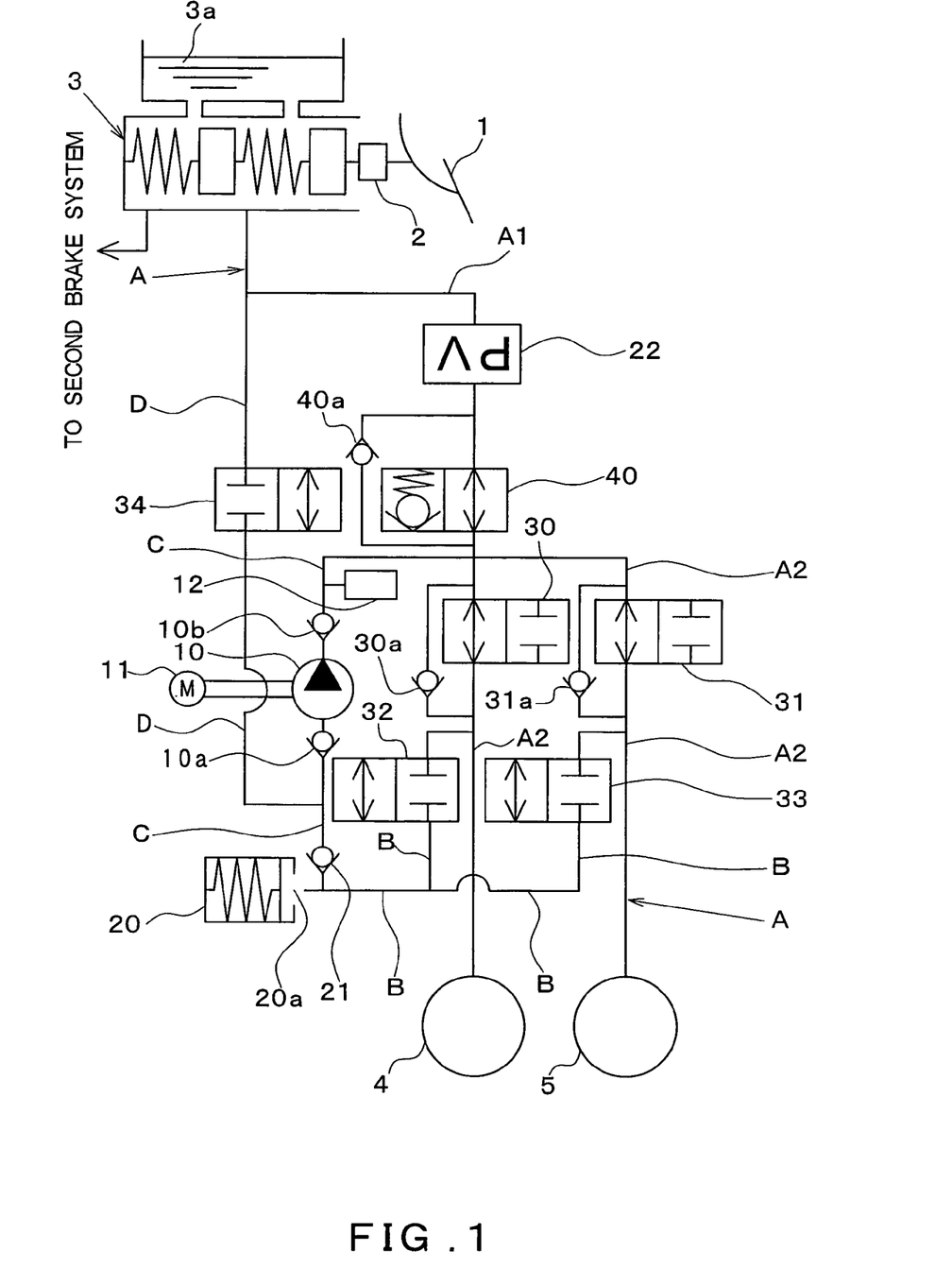
FIG. 1 is a schematic view showing the pipeline configuration of a braking device equipped with a rotary pump according to a first embodiment of the present invention.

FIG. 1 shows the outline of brake pipeline arrangement of a braking device to which a trochoid pump is applied as a rotary pump according to one embodiment of the present invention. The basic configuration of the braking device will be described hereinafter with reference to FIG. 1. This embodiment will be described as to an example in which a braking device according to the present invention is applied to a front-wheel drive four-wheel vehicle including a hydraulic circuit with an X-type pipeline arrangement having a brake system extending between a front-right wheel FR and a rear-left wheel RL and a brake system extending between a front-left wheel FL and a rear-right wheel RR.

As shown in FIG. 1, a brake pedal 1 is connected to a booster 2 that boosts a depressing force applied to the brake pedal 1. The booster 2 has a pushrod or the like for transmitting the boosted depressing force to a master cylinder 3. The pushrod presses a master piston disposed in the master cylinder 3, so that a master cylinder pressure is generated. The brake pedal 1, the booster 2, and the master cylinder 3 correspond to brake fluid pressure generating means.

A master reservoir 3*a* for supplying brake fluid into the master cylinder 3 and storing a surplus of brake fluid in the master cylinder 3 is connected to the master cylinder 3.

The master cylinder pressure is transmitted to a wheel cylinder 4 for the front-right wheel FR and a wheel cylinder 5 for the rear-left wheel RL via an anti-lock brake system (hereinafter referred to as the ABS). The following description will be made as to the side of the front-right wheel FR and the rear-left wheel RL. Since the same holds true for the second brake system on the side of the front-left wheel FL and the rear-right wheel RR, description thereof is omitted.

The braking device is provided with a brake conduit (main brake conduit) A connected to the master cylinder 3. The brake conduit A is provided with a proportional control valve (PV: proportioning valve) 22. The proportional control valve 22 divides the brake conduit A into two parts. That is, the brake conduit A is divided into a brake conduit A1 for receiving a master cylinder pressure between the master cylinder 3 and the proportional control valve 22 and a brake conduit A2 extending from the proportional control valve 22 to the respective wheel cylinders 4 and 5.

The proportional control valve 22 usually performs an operation of transmitting a reference pressure of brake fluid downstream at a predetermined damping ratio when the brake fluid flows in a normal direction. As shown in FIG. 1, the brake fluid pressure on the side of the brake conduit A2 is regarded as a reference pressure by reversely connecting the proportional control valve 22.

The brake conduit A2 of the brake conduit A is divided into two branches. While one of these branches is provided with a pressure increase control valve 30 for controlling the increase in brake fluid pressure applied to the wheel cylinder 4, the other is provided with a pressure increase control valve 31 for controlling the increase in brake fluid pressure applied to the wheel cylinder 5.

These pressure increase control valves 30 and 31 are constructed as two-position valves whose open or close states can be controlled by an electronic control unit (hereinafter referred to as the ECU) for the ABS. When the two-position valves are controlled to their open states, a master cylinder pressure or a brake fluid pressure resulting from the discharge of brake fluid by the pump is applied to the respective wheel cylinders 4 and 5. During normal braking wherein ABS control is not performed, the pressure increase control valves 30 and 31 are always controlled to their open states.

Safety valves 30*a* and 31*a* are provided in parallel with the pressure increase control valves 30 and 31 respectively. The safety valves 30*a* and 31*a* drain brake fluid from the sides of the wheel cylinders 4 and 5 respectively when ABS control is terminated by stopping depressing the brake pedal 1.

Further, pressure decrease control valves 32 and 33 whose open and close states can be controlled by means of the ECU for the ABS are respectively disposed in brake conduits B connecting a reservoir port 20*a* of the reservoir 20 with the brake conduit A at portions between the first and second pressure increase control valves 30 and 31 and the respective wheel cylinders 4 and 5. In a normal braking state (i.e., when the ABS is out of operation), the pressure decrease control valves 32 and 33 are always in their close states.

Being sandwiched between safety valves 10*a* and 10*b*, a rotary pump 10 is disposed in a brake conduit C connecting the proportional control valve 22 and the pressure increase control valves 30 and 31 in the brake conduit A with the reservoir port 20*a* of the reservoir 20. A motor 11 is connected to the rotary pump 10. The motor 11 drives the rotary pump 10. Details of the rotary pump 10 will be described later.

In order to alleviate pulsation of brake fluid discharged from the rotary pump 10, a damper 12 is disposed in the brake conduit C on the discharge side of the rotary pump 10. A brake conduit (auxiliary brake conduit) D is so provided as to connect the master cylinder 3 with a portion between the reservoir 20 and the rotary pump 10. The rotary pump 10 sucks brake fluid in the brake conduit A1 via the brake conduit D and discharges it to the brake conduits A2, thus making a wheel cylinder pressure in the wheel cylinders 4 and 5 higher than a master cylinder pressure and enhancing braking forces applied to the wheels. The proportional control valve 22 maintains a differential pressure between the master cylinder pressure and the wheel cylinder pressure at this moment.

The brake conduit D is provided with a control valve 34, which is always in its close state during normal braking.

A check valve 21 is disposed between a connecting portion of the brake conduits C and D and the reservoir 20 so as to prevent brake fluid from reversely flowing from the brake conduit C to the reservoir 20 due to a fluid pressure transmitted from the brake conduit D at this moment.

The brake conduit A is further provided with a control valve 40 between the proportional control valve 22 and the pressure increase control valves 30 and 31. The control valve 40 is a two-position valve that is normally in its open state. In suddenly braking the wheel cylinders 4 and 5 when the master cylinder pressure is lower than a predetermined pressure or in performing traction control (TRC), the control valve 40 is changed to differential state and thus maintains a differential pressure between the side of the master cylinder and the side of the wheel cylinders.

A safety valve 40*a* is provided in parallel with the control valve 40. When the control valve 40 is in its differential state, a brake fluid pressure is applied from the side of the master cylinder 3 to the side of the wheel cylinders 4 and 5.

Figure 2A:
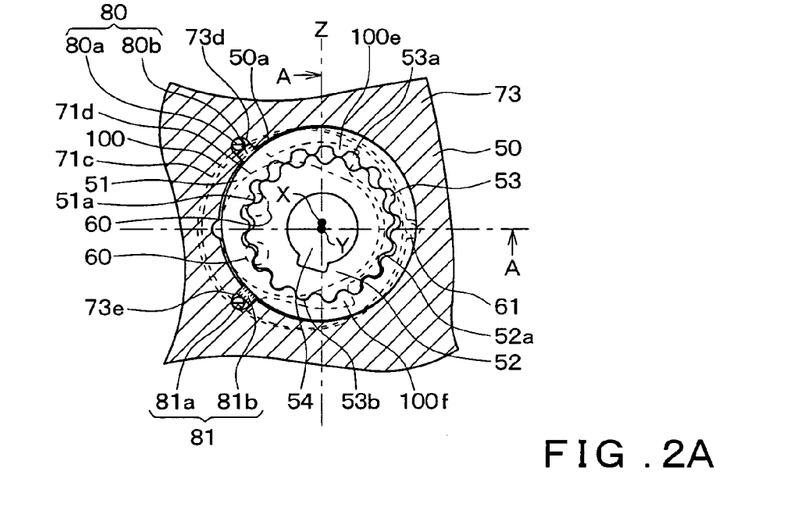
FIG. 2A is a cross-sectional view of the rotary pump 10.
Figure 2B:
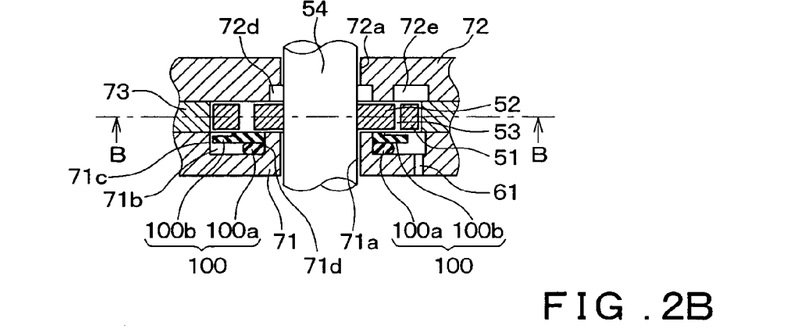
FIG. 2B is a cross-sectional view of FIG. 2A taken along a line A-A.
Figure 2C:
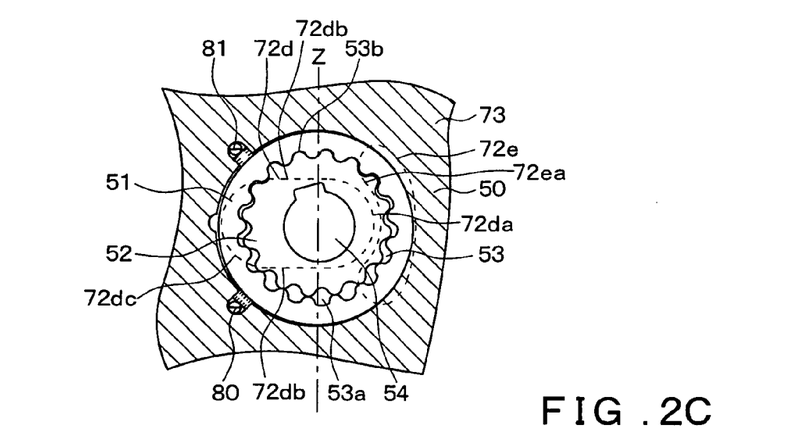
FIG. 2C is a cross-sectional view of FIG. 2B taken along a line B-B.

FIG. 2A is a cross-sectional view of the rotary pump 10. FIG. 2B is a cross-sectional view of FIG. 2A taken along a line A-A. FIG. 2C is a cross-sectional view of FIG. 2B taken along a line B-B. First of all, the structure of the rotary pump 10 will be described with reference to FIGS. 2A, 2B, and 2C.

An outer rotor 51 and an inner rotor 52, whose center axes (points X and Y in FIG. 2A) are eccentric with respect to each other, are mounted and accommodated in a rotor chamber 50*a* of a casing 50 of the rotary pump 10. The outer rotor 51 has an inner toothed portion 51*a* along an inner periphery thereof. The inner rotor 52 has an outer toothed portion 52*a* along an outer periphery thereof. The outer rotor 51 and the inner rotor 52 mesh with each other through the toothed portions 51*a* and 52*a*, while forming a plurality of interstitial portions 53.

As is also apparent from FIG. 2A, the rotary pump 10 of this embodiment is a multiple-teeth trochoid-type pump equipped with no partition plate (crescent) and structured such that the inner toothed portion 51*a* of the outer rotor 51 and the outer toothed portion 52*a* of the inner rotor 52 form the interstitial portions 53. In order to transmit a running torque of the inner rotor 52, the inner rotor 52 and the outer rotor 51 have a plurality of contact points.

As shown in FIG. 2B, the casing 50 is composed of a first side plate 71, a second side plate 72, and a central plate 73. The first side plate 71 and the second side plate 72 are disposed to sandwich both the rotors 51 and 52 from both sides. The central plate 73 is disposed between the first and second side plates 71 and 72 and provided with a hole for accommodating the outer rotor 51 and the inner rotor 52. The first and second side plates 71 and 72 and the central plate 73 form the rotor chamber 50*a*.

Central holes 71*a* and 72*a* communicating with the interior of the rotor chamber 50*a* are formed in central portions of the first and second side plates 71 and 72, respectively. A drive shaft 54 is fitted in the central holes 71*a* and 72*a*. The outer rotor 51 and the inner rotor 52 are rotatably disposed in the hole of the central plate 73. In other words, a rotating portion constituted by the outer rotor 51 and the inner rotor 52 is rotatably mounted in the rotor chamber 50*a* of the casing 50, and while the outer rotor 51 rotates around the point X, the inner rotor 52 and the drive shaft 54 rotate around the point Y.

In addition, given that a line passing through the points X and Y serving as respective rotating axes of the outer rotor 51 and the inner rotor 52 is a centerline Z of the rotary pump 10, a suction port 60 and a discharge port 61 communicating with the rotor chamber 50*a* are formed in the first side plate 71 on the left and right sides with respect to the centerline Z, respectively. The suction port 60 and the discharge port 61 communicate with the interstitial portions 53. Brake fluid flowing from the outside can be sucked into the interstitial portions 53 via the suction port 60, and the brake fluid in the interstitial portions 53 can be discharged to the outside via the discharge port 61.

Among the interstitial portions 53, a containment portion (first containment portion) 53*a* has a maximum volume, and a containment portion (second containment portion) 53*b* has a minimum volume. The containment portions 53*a* and 53*b* communicate with neither the suction port 60 nor the discharge port 61. The containment portions 53*a* and 53*b* maintain a differential pressure between a suction pressure at the suction port 60 and a discharge pressure at the discharge port 61.

The first side plate 71 is provided with a conduction conduit (not shown) for establishing communication between an outer periphery of the outer rotor 51 and the suction port 60, and with a conduction conduit (not shown) for establishing communication between the outer periphery of the outer rotor 51 and the discharge port 61.

A depressed portion 73*d* and a depressed portion 73*e* are formed in a wall surface of the central plate 73 forming the hole thereof, at positions forming about 45° toward the suction port 60 from the centerline Z around the point X serving as the rotating axis of the outer rotor 51. Sealing members 80 and 81 for suppressing the flow of brake fluid along the outer periphery of the outer rotor 51 are provided in the depressed portions 73*d* and 73*e* respectively. The sealing members 80 and 81 seal low brake fluid pressure fields and high brake fluid pressure fields along the outer periphery of the outer rotor 51.

The sealing members 80 and 81 are composed of generally cylindrical rubber members 80*a* and 81*a*, and a rectangular parallelepiped resin members 80*b* and 81*b* made of Teflon, respectively. The resin members 80*b* and 81*b* come into contact with the outer rotor 51 by being pressed by the rubber members 80*a* and 81*a* respectively. That is, since a manufacturing tolerance and the like bring about a minor error in the size of the outer rotor 51, the elastic rubber members 80*a* and 81*a* are provided to absorb the error.

Moreover, as shown in FIG. 2B, a sealing groove portion 71*b* is formed in the first side plate 71. As indicated by a broken line in FIG. 2A, the sealing groove portion 71*b* has a generally circular outer periphery side contour 71*c* and an elliptical inner periphery side contour 71*d*, and configures a toric shape surrounding the drive shaft 54 as a whole. The center of the sealing groove portion 71*b* is eccentric toward the suction port 60 (leftward on the sheet) with respect to the axial center of the drive shaft 54. Thus, the sealing groove portion 71*b* is so disposed as to extend between the discharge port 61 and the drive shaft 54 and pass through the portions where the containment portions 53*a*, 53*b* are disposed and the sealing members 80 and 81 seal the outer rotor 51. The sealing groove portion 71*b* communicates with the discharge port 61.

A sealing member 100 is disposed in the sealing groove portion 71*b* constructed as described above. The sealing member 100 is composed of an elastic member 100*a* made of an elastic body such as rubber, and a resin member 100*b* made of resin.

Figure 3:
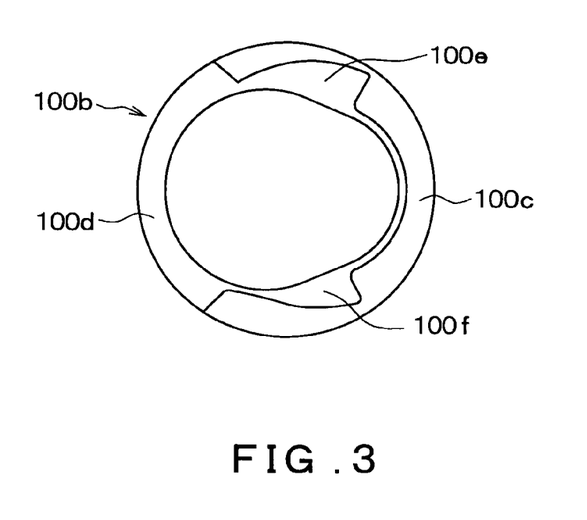
FIG. 3 is a schematic view of a sealing member 100 shown in FIG. 2.

As shown in FIG. 3, the resin member 100*b* is identical in shape to the sealing groove portion 71*b* and configures a toric shape. The resin member 100*b* is a stepped plate having a depressed portion 100*c* and a projecting portion 100*d* formed on the side of one end face thereof.

The resin member 100*b* is disposed in the sealing groove portion 71*b* on the side of the open hole thereof, so that the projecting portion 100*d* is in contact with both the rotors 51 and 52 and one end face of the central plate 73. The elastic member 100*a* is disposed closer to a bottom of the sealing groove portion 71*b* than the resin member 100*b*. The resin member 100*b* is pressed by an elastic force of the elastic member 100*a* and a discharge pressure of brake fluid introduced into the sealing groove portion 71*b*, thus performing a sealing function. A wide portion 100*e* and a wide portion 100*f* formed on the projecting portion 100*d* are so wide as to entirely cover the interstitial portions 53 that do not communicate with the discharge groove 72*e*, thus serving as a seal for preventing brake fluid in the interstitial portions 53 from leaking out.

The sealing member 100 disposed as described above can seal the discharge port 61 as a high-pressure field, a gap portion between the drive shaft 54 and the inner rotor 52 as a low-pressure field, and the suction port 60 as a low-pressure field, in clearances between axially lower end faces of the inner rotor 52 and the outer rotor 51 on the sheet of FIG. 2B and the first side plate 71.

In order to seal the high-pressure and low-pressure fields in the clearances between the axial end faces of the inner rotor 52 and the outer rotor 51 and the first side plate 71, the sealing member 100 is required to pass through a space between the discharge port 61 and the drive shaft 54 and extend to the outer periphery of the outer rotor 51 through a space between the discharge port 61 and the suction port 60.

On the other hand, in this embodiment, that region of the sealing member 100 which extends from the sealing member 80 to the sealing member 81 through the space between the drive shaft 54 and the discharge port 61 is required as a region for sealing the high-pressure and low-pressure fields. The other region of the sealing member 100, which is not required to perform any sealing function and is in contact with the inner rotor 52 and the outer rotor 51, is negligibly small in area. Thus, the contact resistance resulting from the sealing member 100 can be reduced, so that mechanical loss can be reduced.

Meanwhile, as shown in FIG. 2B, each of axial end faces of the outer rotor 51 and the inner rotor 52 located on the upper side of the sheet slides while being pressed against the axial end face of the second side plate 72 at a high pressure, thus establishing a mechanical sealing structure for sealing the high-pressure and low-pressure fields.

As shown in FIGS. 2B and 2C, a suction groove 72d communicating with the suction port 60 and a discharge groove 72e communicating with the discharge port 61 are formed in the axial end face of the second side plate 72 performing the mechanical sealing function.

As indicated by a broken line in FIG. 2C, the suction groove 72d is so formed as to surround the drive shaft 54. In this embodiment, the suction groove 72d configures an oval shape, and the curvature of a circular arc constituted by a side 72da thereof, which faces a side 72ea of the discharge groove 72e on the side of the drive shaft 54, is set larger than that of a circular arc constituted by the side 72ea of the discharge groove 72e. In other words, as is the case with the above-mentioned relationship shown in FIG. 9, a center O1 of the circular arc constituted by the side 72da is located closer to the suction port 60 than a center O2 of the circular arc constituted by the side 72ea.

Therefore, when viewed in the axial direction, the side 72da of the suction groove 72d is located closer to the drive shaft 54 than an inner edge of the sealing groove portion 71b formed in the first side plate 71.

The term "oval" used herein is intended to mean that the suction groove 72d is substantially oval. In fact, as is also apparent from FIG. 4, which will be described later, the circular arc forming part of the oval shape may have a linear tip portion at that position of the suction groove 72d which is most distant from the discharge groove 72e.

As indicated by another broken line in FIG. 2C, the discharge groove 72e configures the shape of a circular arc extending along the rotational direction of the rotary portion and is disposed on the side of the discharge port 61 with respect to the centerline Z. In other words, the discharge groove 72e is disposed on the side of the interstitial portions 53 communicating with the discharge port 61. When viewed in the axial direction of the drive shaft 54, the discharge groove 72e is disposed to overlap with the interstitial portions 53 communicating with the discharge port 61, and to overlap with a portion of the axial end faces of the outer rotor 51 and the inner rotor 52 which surround the interstitial portions 53 communicating with the discharge port 61. Further, the discharge groove 72e is so disposed as to face regions of the end faces of the outer rotor 51 and the inner rotor 52 on the side of the first side plate 71 to which a discharge pressure is applied.

Next, the operations of the braking device and the rotary pump 10 constructed as described above will be described.

The control valve 34 provided in the braking device is set in its open state at an appropriate timing when a large braking force is required, for example, when a braking force corresponding to a brake pedal depressing force cannot be obtained or when the brake pedal 1 is operated by a large amount. A high master cylinder pressure generated by depressing the brake pedal 1 is then applied to the rotary pump 10 via the brake conduit D.

In the rotary pump 10, the inner rotor 52 makes a rotational movement as the drive shaft 54 rotates by being driven by the motor 11. In accordance with the rotational movement of the inner rotor 52, the outer rotor 51 also rotates in the same direction due to the meshing of the inner toothed portion 51a with the outer toothed portion 52a. In this case, the respective interstitial portions 53 increase and decrease in volume while the outer rotor 51 and the inner rotor 52 rotate by 360°. Thus, brake fluid is sucked from the suction port 60 and discharged from the discharge port 61 toward the brake conduits A2.

As described above, the rotary pump 10 of this embodiment performs basic pumping operations of sucking brake fluid from the suction port 60 and discharging brake fluid from the discharge port 61 through rotation of the rotors 51 and 52. The brake fluid discharged by the rotary pump 10 achieves an increase in wheel cylinder pressure.

In those pumping operations, the brake fluid sucked through the conduction conduit holds the outer periphery of the outer rotor 51 on the side of the suction port 60 at a suction pressure, and holds the outer periphery of the outer rotor 51 on the side of the discharge port 61 at a discharge pressure. Thus, low-pressure and high-pressure fields are generated on the outer periphery of the outer rotor 51. In the clearances between the axial end faces of the inner rotor 52 and the outer rotor 51 and the first and second side plates 71 and 72 as well, low-pressure and high-pressure fields are generated respectively by the low-pressure suction port 60 and the low-pressure gap between the drive shaft 54 and the inner rotor 52 and by the high-pressure discharge port 61.

Under this situation, the provision of the sealing members 80 and 81 and the sealing member 100 prevents brake fluid from leaking from the high-pressure side to the low-pressure side through the outer periphery of the outer rotor 51 or the clearances between the axial end faces of the outer rotor 51 and the inner rotor 52 and the first side plate 71. Although it is apparent from FIG. 2 that the sealing member 100 is out of contact with the outer rotor 51 and the inner rotor 52, the sealing member 100 flexes in accordance with an increase in pressure of the discharge port 61 and then comes into complete contact with the outer rotor 51 and the inner rotor 52 to perform a sealing function.

Then, the axial end faces of the outer rotor 51 and the inner rotor 52 are directly pressed against the second side plate 72, so that a mechanical sealing mechanism is constituted. This makes it possible to prevent brake fluid from leaking from the high-pressure side to the low-pressure side through the clearances between the second side plate 72 and the axial end faces of the outer rotor 51 and the inner rotor 52.

Owing to the sealing members 80 and 81, that region of the outer periphery of the outer rotor 51 which is on the side of the suction port 60 is at a low pressure that is substantially equal to the pressure of the interstitial portions 53 communicating with the suction port 60, and that region of the outer periphery of the outer rotor 51 which is on the side of the discharge port 61 is at a high pressure that is substantially equal to the pressure of the interstitial portions 53 communicating with the discharge port 61. Thus, the pressures outside and inside the outer rotor 51 are balanced with each other, so that the pump can be stably driven.

In addition, since both the rotors 51 and 52 are pressed back toward the first side plate 71 due to the discharge pressure of brake fluid guided to the discharge groove 72e, the force for pressing both the rotors 51 and 52 against the second side plate 72 is reduced. This leads to a reduction in friction resistance. Therefore, it is possible to prevent or suppress an increase in driving torque in the case where mechanical sealing is adopted.

The discharge groove 72e is disposed to face the regions of the end faces of both the rotors 51 and 52 on the side of the first side plate 71 to which a discharge pressure is applied, and the suction groove 72d is disposed to face those regions of the end faces of both the rotors 51 and 52 on the side of the first side plate 71 to which a suction pressure is applied. Therefore, the pressures applied to both the rotors 51 and 52 can be balanced with each other, which makes it possible to suppress an increase in driving torque resulting from a one-side contact or the like.

In this embodiment, the curvature of the circular arc constituted by the side 72da of the suction groove 72d is larger than that of the circular arc constituted by the side 72ea of the discharge groove 72e. Thus, when the suction groove 72d and the discharge groove 72e are viewed in the axial direction of the drive shaft 54, the distance between the suction groove 72d and the discharge groove 72e in the radial direction of the rotary portion is short in a region intersecting with a line W perpendicular to the centerline Z, and this distance increases in accordance with a decrease in distance from the containment portions 53a and 53b.

It is therefore possible to ensure a sufficient distance between the discharge groove 72e and the suction groove 72d and enhance a total fluid pressure generated therebetween, and the contact surface pressure that is necessitated by the second side plate 72 to obtain a press-back force when being in contact with the outer rotor 51 and the inner rotor 52 is reduced. Consequently, the driving torque of the rotary pump can be reduced. That is, as described above, the gradient of fluid pressure distribution can be made gentler than that of the conventional fluid pressure distribution by increasing the contact area between the second side plate 72 and the outer and inner rotors 51 and 52 (see FIG. 8B).

It is therefore possible to prevent or suppress an increase in driving torque in the case where mechanical sealing is adopted.

In this embodiment, moreover, the suction groove 72d configures an oval shape. In other words, the suction groove 72d includes the circular-arc side 72da and straight line portions 72db constituting parallel lines. Since the suction groove 72d configures such a simple shape, the distance between the straight line portions 72db constituting the parallel lines is easy to measure. Thus, the suction groove 72d can be easily machined. Another effect obtained from the suction groove 72d is that the amount of abrasion of toothed tools is easily measured on the basis of a distance between the straight line portions 72db constituting the parallel lines. Still another effect obtained from the suction groove 72d is that the parallel lines make it easy to hold the inner rotor 52 by means of a chuck.

Figure 4:
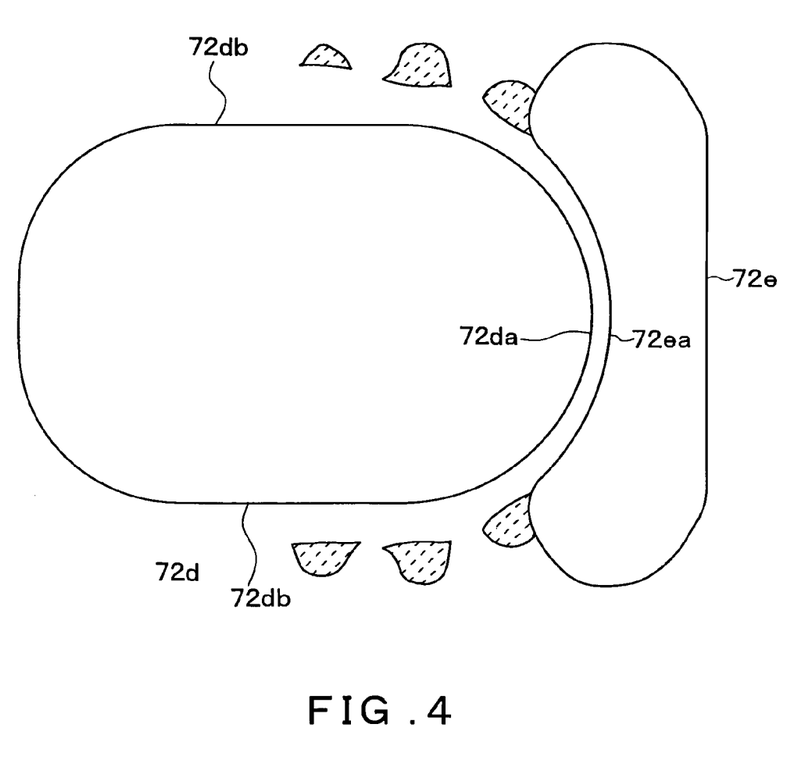
FIG. 4 is a schematic view showing a result obtained by checking a surface pressure applied to a second side plate of the rotary pump shown in FIG. 2.

For reference, the surface pressure applied to the second side plate 72 of the rotary pump 10 of this embodiment in the neighborhood of the side 72da of the suction groove 72d was measured. FIG. 4 shows a result obtained from this measurement.

Regions where the surface pressure applied to the second side plate 72 through contact with the outer rotor 51 and the inner rotor 52 is increased are hatched in FIG. 4. It is apparent that the contact surface pressure has been sufficiently reduced in comparison with the case of the conventional rotary pump shown in FIG. 7. This result also reveals that the driving torque of the rotary pump of this embodiment has been reduced.

OTHER EMBODIMENTS

The case described in the aforementioned embodiment where the suction groove 72d configures an oval shape is nothing but an example. In other words, the above-mentioned effects can be achieved (1) if the curvature of the circular arc constituted by the side 72da of the suction groove 72d is larger than that of the circular arc constituted by the side 72ea of the discharge groove 72e or (2) if the side 72da of the suction groove 72d formed in the second side plate 72 is disposed inside the inner edge of the sealing groove portion 71b formed in the first side plate 71.

It is appropriate that the aforementioned relationship wherein the distance between the suction groove 72d and the discharge groove 72e is short in the region intersecting with the line W perpendicular to the centerline Z and then increases in accordance with a decrease in distance from the containment portions 53a and 53b be established at least in the neighborhood of the containment portions 53a and 53b. For instance, the aforementioned relationship may not be established if part of the suction groove 72d or the discharge groove 72e is formed unlike a circular arc. However, the above-mentioned effects can be achieved even in such cases.

While the above description is of the preferred embodiments of the present invention, it should be appreciated that the invention may be modified, altered, or varied without deviating from the scope and fair meaning of the following claims.

What is claimed is:

1. A rotary pump for a braking device, comprising:
   a rotary portion that is equipped with an outer rotor having an inner toothed portion along an inner periphery thereof and an inner rotor having an outer toothed portion along an outer periphery thereof and making a rotational movement around a drive shaft, and that is mounted and constructed such that a plurality of interstitial portions are formed by meshing the inner toothed portion and the outer toothed portion with each other; and
   a casing that has a central hole into which the drive shaft is fitted, a suction port for sucking brake fluid into the rotary portion, and a discharge port for discharging the brake fluid from the rotary portion, and that covers the rotary portion,
   wherein while a first containment portion as one of the plurality of interstitial portions with a maximum volume and a second containment portion as one of the plurality of interstitial portions with a minimum volume serve to maintain a differential pressure between the suction port and the discharge port, the brake fluid is sucked from the suction port and discharged from the discharge port through a rotational movement of the rotary portion;

the casing has a first side plate and a second side plate sandwiching the outer rotor and the inner rotor in an axial direction of the drive shaft;

the first side plate is provided with sealing means for sealing spaces between axial end faces of the outer rotor and the inner rotor and an axial end face of the first side plate, on one side in the axial direction of the drive shaft in the rotary portion;

the outer rotor and the inner rotor are pressed against the second side plate due to a discharge pressure of the brake fluid acting on the sealing means on the other side in the axial direction in the rotary portion, so that spaces between the axial end faces of the outer rotor and the inner rotor and an axial end face of the second side plate are mechanically sealed;

the second side plate is provided with a discharge groove communicating with the discharge port and a suction groove communicating with the suction port in the mechanically sealed axial end face of the second side plate;

the discharge groove and the suction groove include a circular-arc side facing the suction groove and a circular-arc side facing the discharge groove respectively; and the circular-arc side of the suction groove has a larger curvature than the circular-arc side of the discharge groove.

2. The rotary pump according to claim 1, wherein the suction groove configures an oval shape having circular arc portions and parallel straight line portions.

3. A rotary pump for a braking device, comprising:
a rotary portion that is equipped with an outer rotor having an inner toothed portion along an inner periphery thereof and an inner rotor having an outer toothed portion along an outer periphery thereof and making a rotational movement around a drive shaft, and that is mounted and constructed such that a plurality of interstitial portions are formed by meshing the inner toothed portion and the outer toothed portion with each other; and a casing that has a central hole into which the drive shaft is fitted, a suction port for sucking brake fluid into the rotary portion, and a discharge port for discharging the brake fluid from the rotary portion, and that covers the rotary portion, wherein while a first containment portion as one of the plurality of interstitial portions with a maximum volume and a second containment portion as one of the plurality of interstitial portions with a minimum volume serve to maintain a differential pressure between the suction port and the discharge port, the brake fluid is sucked from the suction port and discharged from the discharge port through a rotational movement of the rotary portion;

the casing has a first side plate and a second side plate sandwiching the outer rotor and the inner rotor in an axial direction of the drive shaft;

the first side plate is provided with sealing means for sealing spaces between axial end faces of the outer rotor and the inner rotor and an axial end face of the first side plate, on one side in the axial direction of the drive shaft in the rotary portion;

the outer rotor and the inner rotor are pressed against the second side plate due to a discharge pressure of the brake fluid acting on the sealing means on the other side in the axial direction in the rotary portion, so that spaces between the axial end faces of the outer rotor and the inner rotor and an axial end face of the second side plate are mechanically sealed;

the second side plate is provided with a discharge groove communicating with the discharge port and a suction groove communicating with the suction port in the mechanically sealed axial end face of the second side plate;

the discharge groove and the suction groove include a circular-arc side facing the suction groove and a circular-arc side facing the discharge groove respectively; and a center of the circular arc constituted by the side of the discharge groove is located closer to the suction port than a center of the circular arc constituted by the side of the suction groove.

4. A rotary pump for a braking device, comprising:
a rotary portion that is equipped with an outer rotor having an inner toothed portion along an inner periphery thereof and an inner rotor having an outer toothed portion along an outer periphery thereof and making a rotational movement around a drive shaft, and that is mounted and constructed such that a plurality of interstitial portions are formed by meshing the inner toothed portion and the outer toothed portion with each other; and a casing that has a central hole into which the drive shaft is fitted, a suction port for sucking brake fluid into the rotary portion, and a discharge port for discharging the brake fluid from the rotary portion, and that covers the rotary portion, wherein while a first containment portion as one of the plurality of interstitial portions with a maximum volume and a second containment portion as one of the plurality of interstitial portions with a minimum volume serve to maintain a differential pressure between the suction port and the discharge port, the brake fluid is sucked from the suction port and discharged from the discharge port through a rotational movement of the rotary portion;

the casing has a first side plate and a second side plate sandwiching the outer rotor and the inner rotor in an axial direction of the drive shaft;

the first side plate is provided with sealing means for sealing spaces between axial end faces of the outer rotor and the inner rotor and an axial end face of the first side plate, on one side in the axial direction of the drive shaft in the rotary portion;

the outer rotor and the inner rotor are pressed against the second side plate due to a discharge pressure of the brake fluid acting on the sealing means on the other side in the axial direction in the rotary portion, so that spaces between the axial end faces of the outer rotor and the inner rotor and an axial end face of the second side plate are mechanically sealed;

the second side plate is provided with a suction groove communicating with the suction port in the mechanically sealed axial end face of the second side plate;

the first side plate is formed with a sealing groove portion passing through a space between the discharge port and the drive shaft and extending to the outer periphery of the outer rotor through the first containment portion and the second containment portion;

the sealing means is disposed in the sealing groove portion; and a distance between the sealing groove and the suction groove in a radial direction of the rotary portion gradually increases in accordance with a decrease in distance from the first containment portion and the second containment portion when the suction groove and the sealing groove portion are viewed in the axial direction of the drive shaft.

* * * * *